United States Patent
Kremer et al.

(10) Patent No.: US 12,172,852 B2
(45) Date of Patent: Dec. 24, 2024

(54) HANDLING DEVICE FOR A FLAT PIECE

(71) Applicant: IAI industrial systems B.V., Veldhoven (NL)

(72) Inventors: Jurgen Kremer, Breda (NL); Johannes Hendrikus Antonius Verheijen, Eindhoven (NL); Willy Driessen, Vught (NL)

(73) Assignee: IAI industrial systems B.V., Veldhoven (NL)

( * ) Notice: Subject to any disclaimer, the term of this patent is extended or adjusted under 35 U.S.C. 154(b) by 447 days.

(21) Appl. No.: 17/645,865

(22) Filed: Dec. 23, 2021

(65) Prior Publication Data

US 2022/0212882 A1 Jul. 7, 2022

(30) Foreign Application Priority Data

Dec. 29, 2020 (EP) .................................... 20217578

(51) Int. Cl.
*B65H 5/04* (2006.01)
*B65G 47/91* (2006.01)
*B65H 5/12* (2006.01)

(52) U.S. Cl.
CPC .................................... *B65G 47/91* (2013.01)

(58) Field of Classification Search
CPC ................ B65H 47/91; B65H 2404/65; B65H 2404/654; B65H 2404/6551;
(Continued)

(56) References Cited

U.S. PATENT DOCUMENTS

| 3,527,401 A | 9/1970 | Bye-jorgensen et al. |
| 3,776,134 A | 12/1973 | Wenger |

(Continued)

FOREIGN PATENT DOCUMENTS

| DE | 102015115141 A1 * | 3/2017 | ............. B42C 1/00 |
| EP | 0374556 A2 | 6/1990 | |
| EP | 3527401 | 8/2019 | |

OTHER PUBLICATIONS

"European Application Serial No. 20217578.2, Extended European Search Report mailed Oct. 11, 2021", 8 pgs.

(Continued)

*Primary Examiner* — Luis A Gonzalez
(74) *Attorney, Agent, or Firm* — Schwegman Lundberg & Woessner, P.A.

(57) ABSTRACT

The invention relates to a handling device for presenting a flat piece to at least a first and a second treatment device in particular for presenting a plastic card substrate to a printer device and a flipping device. The handling device comprises an elongated backbone element, wherein the backbone element is rotatable along a longitudinal axis and has at least a first and a second angular position; a holding element configured to hold the flat piece relative to the backbone element; and a control unit, configured to control the angular position of the backbone element; wherein, when the backbone element is at the first angular position, the flat piece is at a first treatment position for the first treatment device, and when the backbone element is at the second angular position, the flat piece is at a second treatment position for the second treatment device.

16 Claims, 3 Drawing Sheets

Figure 1A:
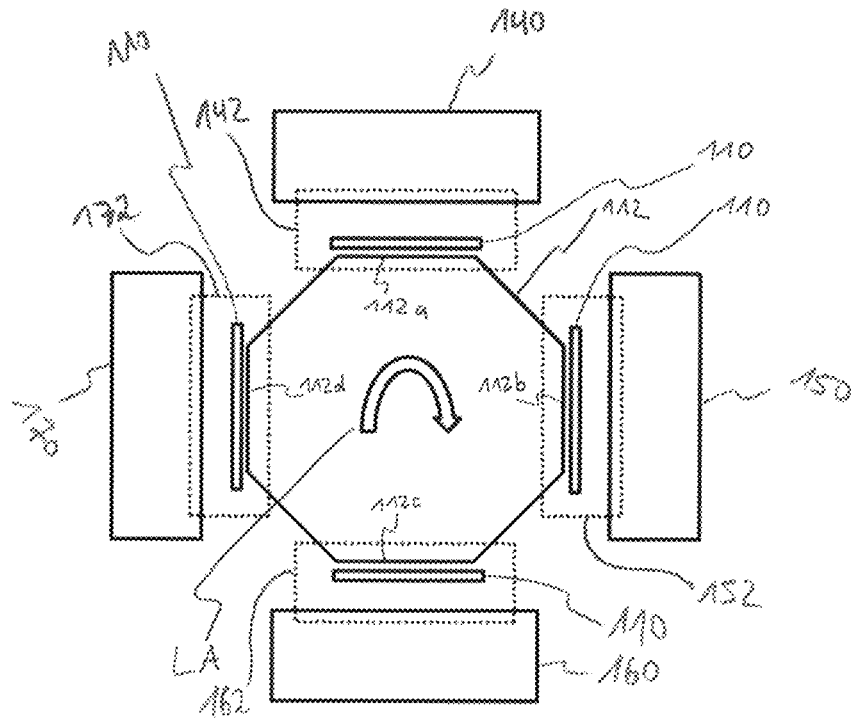

(58) Field of Classification Search
CPC .... B65H 2701/1914; B65H 5/04; B65H 5/12; B65H 5/18; B65H 5/222; B65H 5/226; B41J 13/12; B41J 13/223; B41J 13/226; B41J 11/04; B41J 11/057; B41J 11/0085; B41J 3/54; B41J 3/543; B41J 3/62
See application file for complete search history.

(56) References Cited

U.S. PATENT DOCUMENTS

| | | | | |
|---|---|---|---|---|
| 7,675,534 | B2* | 3/2010 | Fowlkes | B41J 13/0027 347/171 |
| 7,878,505 | B2* | 2/2011 | Meier | B65H 5/18 271/298 |
| 2003/0234851 | A1* | 12/2003 | Booth | B41J 11/04 347/104 |
| 2009/0073195 | A1* | 3/2009 | Ozawa | B41J 3/543 347/4 |
| 2011/0102501 | A1* | 5/2011 | Akahane | B41J 11/04 347/31 |
| 2015/0138290 | A1* | 5/2015 | Matsuhashi | B41J 11/0022 347/102 |
| 2018/0297360 | A1* | 10/2018 | Muramatsu | B41J 29/38 |
| 2022/0226947 | A1* | 7/2022 | Augustinus | B23K 26/0006 |

OTHER PUBLICATIONS

"European Application Serial No. 20217578.2, Communication Pursuant to Article 94(3) EPC mailed May 21, 2024", 5 pgs.

* cited by examiner

HANDLING DEVICE FOR A FLAT PIECE

The present application claims the benefit of priority to European Appl. No. 20217578.2, titled "Handling Device for a Flat Piece," filed Dec. 29, 2020, which is hereby incorporated by reference herein in its entirety.

The present invention relates to a handling device for presenting a flat piece to at least a first and a second treatment device, in particular for presenting a plastic card substrate to a printer device and a flipping device. Further, it relates to a method for operating the handling device.

Flat pieces such as plastic cards are used in different technical areas and need to be treated in different ways. For example, a card printer can be used to print an image and/or graphical elements on the flat piece, a laser may be used for engraving, the flat piece may be laminated, cured, cut, embossed or otherwise treated.

One requirement for performing such treatments and manipulations in an efficient and highly automated manner for handling the cards. For example, the flat pieces are transferred from a supply to several different treatment devices reliably and with the possibility to treat the same card several times.

Different methods for handling flat pieces have been suggested. For examples, rollers can be used to transport flat pieces along a defined path, or the flat pieces can be carried on a transport belt. However, there is a need for easier, more efficient and reliable handling techniques. Flat pieces need to be transferred from a supply to treatment devices and provided reproducibly, in particular several times to a treatment device.

It is the problem of the invention to provide an improved handling device for presenting a flat piece to at least a first and a second treatment device, in particular for presenting a plastic card substrate to a printer device and a flipping device.

This problem is solved by a handling device and a method according to the independent claims of the attached set of claims. Further advantageous embodiments are given in the dependent claims.

The handling device for presenting a flat piece to at least a first and a second treatment device, in particular for presenting a plastic card substrate to a printer device and a flipping device, comprises an elongated backbone element. The backbone element is rotatable along a longitudinal axis and has at least a first and a second angular position. Furthermore, the device comprises a holding element, which is configured to hold the flat piece relative to the backbone element, and a control unit, which is configured to control the angular position of the backbone element. Therein, when the backbone element is at the first angular position, the flat piece is at a first treatment position for the first treatment device. On the other hand, when the backbone element is at the second angular position, the flat piece is at a second treatment position for the second treatment device.

Thus, the flat piece is advantageously presented to the first and second treatment device, respectively, by changing the angular position of the backbone element. In particular, the backbone element is rotated around its longitudinal axis such that the flat piece is provided at the first or second treatment position. This allows easily changing the flat piece between the different treatment devices.

In particular, the elongated backbone element may comprise a beam structure. It may have an elongated shape and may be connected to the holding element.

The holding element is configured to hold flat pieces in a position and/or orientation relative to the backbone element.

Thus, when the backbone element is moved by rotation and/or rotation, the absolute position of the flat piece changes accordingly, while the relative position towards the backbone element stays constant.

In particular, the control unit is configured to control a motor and generate a control signal, which causes the motor to rotate the backbone element to a predetermined angular position. In addition to that, the control unit may also control one or several holding elements to hold and/or release flat pieces.

In particular, the term "treatment position" may correspond to a pose, i.e., a combination of position and orientation, where a flat piece can be treated by the first or second treatment device.

For example, the treatment position may comprise an orientation of a surface of the flat piece facing upwards, downwards or sideways.

Also, the treatment position or pose may be understood to indicate that a flat piece is arranged at a treatment position or within a defined treatment space, in which the treatment device may treat the flat piece.

For example, a printer device may print on the surface of a flat piece, which is held in a certain orientation and position relative to the printer device. This treatment position is reached, for example, when the flat piece is held at a lateral face of the backbone element, while the backbone element has reached a certain angular position, wherein the lateral face is oriented towards the appropriate direction. Thus, the flat piece is arranged in a treatment space, in which the printer device can perform printing operations on the card.

Similar examples apply to other treatment devices, such as devices for curing, imaging, engraving, stamping, embossing, or further handling of the flat pieces such as flipping or removing a flat piece from the holding element.

In an embodiment of the handling device, the holding element is configured to hold the flat pieces on the faces by applying suction and/or by clamping. The flat piece is therefore held advantageously precisely at a pre-determined position and is securely held in place.

For example, the holding element or a plurality of holding elements may comprise a connection to a vacuum system. They may also have openings at the faces of the backbone element, through which air suction is provided and a suction force is provided to secure flat pieces, in particular plastic cards, which are arranged close to these openings.

In order to provide vacuum or negative pressure for the holding elements, a vacuum pump or similar device may be connected to the holding elements.

A clamping to hold the flat pieces can be configured in different ways. For example, a flat piece can be placed between clamping elements, which can be arranged opposite to each other and exert a clamping force on the flat piece. Also, a flat piece can be held by friction; for example, the flat piece may be held between guide elements, which exert pressure against the flat piece such that a defined friction occurs between the surface of the flat piece and the guide elements. In further embodiments, the holding elements may be configured to hold flat pieces with a defined play, for example allowing the flat piece to move within a defined range.

In another embodiment, the elongated backbone element comprises at least a first and a second lateral face, and at least a first and a second holding element are provided, configured for holding flat pieces at the first and second lateral face, respectively. Thus, a first and second flat piece can be held at the first and second lateral face of the backbone, respectively. Thus, two or more flat pieces can advantageously be treated by different treatment devices, simultaneously or subsequently, and/or the flat pieces can be presented to the same treatment device one after the other.

In particular, a first holding element may be configured for holding at least one flat piece on the first lateral face, and a second holding element may be configured to hold at least one flat piece on the second lateral face of the backbone element.

When a flat piece is held at a lateral face, its surface is oriented essentially parallel to the respective face of the backbone element. In particular, the holding elements are configured to hold the flat pieces in a position at least partially at one of the faces of the backbone element, and secure the flat pieces against a translation with respect to the respective face of the backbone element. Thus, when the backbone element is rotated around its longitudinal axis, the cards that are held by the holding elements are rotated around the same axis together with the faces.

In an embodiment, when the backbone element is at the first angular position, a first flat piece, which is held at the first lateral face, is at the first treatment position for the first treatment device, and, when the backbone element is at the second angular position, a second flat piece, which is held at the second lateral face, is at the first treatment position for the first treatment device.

This allows advantageously a very efficient treatment of two or several flat pieces, one after the other, by the same treatment device.

Thus, two or several flat pieces can be treated by the first treatment device one after the other: In a first step, the first flat piece is presented to the first treatment device, and in a second step, the backbone element is rotated into the second angular position, thereby presenting the second flat piece to the first treatment device.

In particular, separate holding elements may be provided on each lateral face of the backbone element.

In an embodiment, each longitudinal face of the backbone element has at least two holding elements. In particular, the holding elements are configured such that at least two flat pieces can be held on one face of the backbone element. Thus, a plurality of flat pieces can be advantageously treated in a highly efficient and automated manner.

Thus, several cards can be held on each lateral face by one holding element each. In particular, several holding elements are provided for each of the lateral faces. The holding elements of one lateral side may be arranged besides each other along the longitudinal direction, i.e., along the direction of the longitudinal axis of the backbone element.

In an embodiment, the backbone element has three or four lateral faces, wherein, optionally, the backbone element may have a cross section in form of an equilateral triangle or a square. Thus, the backbone element has advantageously a very regular form, which can be easily controlled.

The backbone element may have a polygonal cross section. In further embodiments, the cross section may comprise a large number of sides and/or faces.

In further embodiments, the cross section may be circular, wherein the "faces" of such a backbone element may be defined by an arrangement of holding elements, which are configured to hold flat pieces in a certain plane, which is then defines as "face" of the backbone element.

In particular, the backbone element has a cross section, wherein opposite sides have the same length; in other words, opposite lateral sides of the backbone element have the same width. In particular, all sides, which have a holding element, may have the same width and/or cover the same area.

A system for treating flat pieces, in particular for printing on plastic card substrates, comprises a handling device, which is configured for holding at least a first and a second flat piece at a first and second position relative to the handling device, a first treatment device, which is configured for treating a flat piece at a first treatment position, and a second treatment device, which is configured for treating a flat piece at a second treatment position. Therein, the handling device is rotatable around a longitudinal axis to at least a first and a second angular position. Also therein, the first flat piece is at the first treatment position, when the handling device is at the first angular position, and the second flat piece is at the first treatment position, when the handling device is at the second angular position.

In particular, the system uses the above-described handling device. It has therefore the same advantages as the handling device.

At least two flat pieces can subsequently be presented to the same treatment device in a highly efficient and automated manner.

In an embodiment of the system, the first and/or second treatment device is configured movably with respect to the treatment position. Thus, the treatment devices can advantageously be used to treat several flat pieces, when the backbone element is rotated into the first angular position.

In particular, the treatment device can be configured such that it is translationally movable parallel to the direction of the longitudinal axis of the handling device. Additionally or alternatively, the treatment device can be configured such that it is translationally movable in a direction perpendicular to the direction of the longitudinal axis of the handling device. Additionally or alternatively, the treatment device can be configured such that it is rotationally movable relative to the longitudinal axis of the handling device.

In particular, the first and/or second treatment device may be configured such that it can move translationally with respect to the treatment position, for example along the longitudinal axis of the backbone element. Also, the first and/or second treatment device may be configured such that it is not rotatably movable with respect to the treatment position.

In particular, the handling device can be configured to only move translationally, not rotatably.

For example, two or more flat pieces, which are held on the same face of the backbone element, can be treated by the same treatment device.

In another embodiment, the first and/or second treatment device is one of a printer device, a feeding device, a flipping device, an imaging device and a curing device. Further examples may include devices for engraving by laser or other techniques, for encoding data, in particular on a magnetic strip, for embossing, for laminating or for including further elements, such as electronic components or image elements. Thus, important treatments can advantageously be performed on the flat pieces.

In general, a "treatment" of a flat piece may be understood in a broad sense, in particular comprising general methods for manipulating a flat piece.

For example, the system can be used to manufacture cards for identification purposes.

In particular, a printer device is configured to print on a surface of the flat piece. To this end, the printer device may comprise a nozzle for outputting ink to the surface. Several nozzles may be provided, e.g. in a nozzle plate.

In particular, a feeding device is configured to provide flat pieces to or removing a flat piece from the transport device, when a face is positioned in a feeding area. For example, a flat piece may be taken up from a supply and fed to the handling device, such that it is held by a holding element. On the other hand, a flat piece can be removed from the handling device, in particular by releasing the flat piece from the holding device and taking it from the handling device to an output. Thus, flat pieces are charge and/or discharge from the handling device.

In particular, a flipping device is configured to flip a flat piece that is held at the handling device, when the backbone element is positioned at one of the angular positions. To flip a flat piece, it is first removed from the holding element, flipped and fed again to the backbone element, in particular to the same holding element as before. Thus, the flat piece's orientation is changed and, e.g., another side of the flat piece is presented to a printer or other treatment device.

In particular, an imaging device is configured to perform an optical measurement on a flat piece, when it is positioned at one of the angular positions. Imaging may, e.g., occur to perform calibration and/or fiducial measurements. For example, reference points are identified with relation to the flat piece and their positions are provided to other treatment devices. Thus, these other devices may perform a precise treatment with regards to the reference points.

In particular, a curing device may be configured to perform a curing treatment to a flat piece, when it is positioned at one of the angular positions.

Also, treatment device may be provided for engraving, for example laser engraving, embossing and/or laminating the flat piece.

Also, the invention relates to a method for operating a handling device according to the above description. The method comprises holding a flat piece at a first lateral face of the handling device, and generating a control signal to control a rotation of the handling device around a longitudinal axis to a first or second angular position. Therein, at the first angular position, the flat piece is at a first treatment position for the first treatment device, and, at the second angular position, the flat piece is at a second treatment position for the second treatment device.

In particular, the method is configured to operate the handling device and system. Thus, it has the same advantages as the system of the invention.

In an embodiment, the handling device is rotated to the first angular position and the flat piece is treated by the first treatment device, subsequently, the handling device is rotated to the second angular position and the flat piece is treated by the second treatment device, and subsequently, the handling device is rotated back to the first angular position and the flat piece is treated a second time by the first treatment device. This allows advantageously treating the same flat piece twice by the same treatment device.

In an embodiment, the treatment of the flat piece by the second treatment device comprises flipping the flat piece, such that, when the flat piece is treated a second time by the first treatment device, another surface side of the flat piece is treated.

The flat piece can therefore advantageously be treated on both sides. For example, a printer can print an image or graphics on the flat piece on a front and back side.

Furthermore, a device for presenting a flat piece to at least a first treatment device, in particular for presenting a plastic card substrate to a printer device, comprises a transport element for holding and transporting the flat piece. Here, the transport element has a loading position, where the flat piece is loaded onto the transport element, and the transport element has a treatment position, where the flat piece is presented to the first treatment device. Also, the system further comprises a control unit, which is configured to generate a control signal for controlling a transport switching element at a transport switching position of the transport element. Herein, the transport switching element is configured, depending on the control signal, to either feed the flat piece towards the treatment position or to initiate an unloading of the flat piece from the transport element.

In particular, the transport device may define a transport path, along which the flat piece is transported.

It is therefore easy to treat a flat piece twice or multiple times by the same treatment device. For example, a flat piece can be transported to a printer, which prints on a first side of the flat piece, and further to the switching position, from where the flat piece can be either transported again to the treatment device, or it can be unloaded. Between the first and second treatment by the same first treatment device, the flat piece can be flipped, such that the opposite side is treated in the second run.

The transport element may comprise a transport belt or another means of transportation, as described above.

After the flat piece is loaded onto the transport element, the flat piece may be held at a position of the transport element, e.g., by suction or clamping.

After loading the flat piece onto the transport element, is in particular held on the transport element, e.g., by clamping or suction, like from a vacuum system, or a holding element may be provided on the transport element or in connection with the transport element After the flat piece has been presented to the first treatment device, it may be treated.

The flat piece may be unloaded from the transport element, e.g., by an unloading element, such as a pusher.

The transport element may, e.g. comprise or be configured as a belt or similar transport means.

Also, different ways may be utilized to load the flat piece onto the transport element: For example, a loading device may be used, such as a slider, pusher or feeding device, which translates the flat piece such that it is loaded onto the transport element. In particular, the loading may comprise a positioning step, e.g., wherein the flat piece is positioned in a defined arrangement relative to the transport element and/or another element.

In an embodiment, the transport switching position of the transport element (belt) is arranged downstream (relative to a transport direction) from the treatment position. Thus, the flat piece is advantageously first treated, and then the control signal decides, whether it is transported to the treatment device again or whether it is output.

In particular, the transport element may have a transport direction, in which the flat piece is transported. For example, the transport element may comprise a belt with a defined transport direction.

The transport element may be configured such that one transport direction is defined, while no transport in the opposite direction is carried out, in particular at least during standard operation of the device. Thus, an arrangement of the transport switching position downstream from the treatment position may be defined such that the card reaches the switching position only after having passed the treatment position first.

The transport element may have a round or circular configuration. Also, the transport element can be configured in another configuration, which builds a closed loop, g.e., an elliptical, squared, rectangular or other shape, such that iterative treatment of the same flat piece can be carried out. For example, the same flat piece may be treated by the treatment device, and, after reaching the transport switching position, subsequently be fed again to the same treatment device.

To this end, the transport device may comprise one or several belts, which are arranged such that the flat piece can be transported in a circular fashion, i.e., it can reach specific points along a transportation path several times, while the transport direction is kept the same at all times.

In an embodiment, another treatment device for treating the flat piece may be provided, e.g., for flipping the flat piece in order to present another side or orientation to the first treatment device, when the flat piece is presented again to the first treatment device along the transport path.

For example, the first treatment device may be a printer and a second treatment device may be a card flipper. A plastic card may then be loaded onto the transport device, e.g., a belt. It is transported for a first time to the printer and afterwards flipped on the other side by the card flipper. When the card reaches the transport switching position—which may be arranged before or after the second treatment device/card flipper—it is directed towards the printer again. Thus, the card can be printed on both sides. Afterwards, in this example, the card reaches the transport switching position again and is guided towards a feed-out element and removed from the transport device, e.g., to be processed further.

Figure 1B:
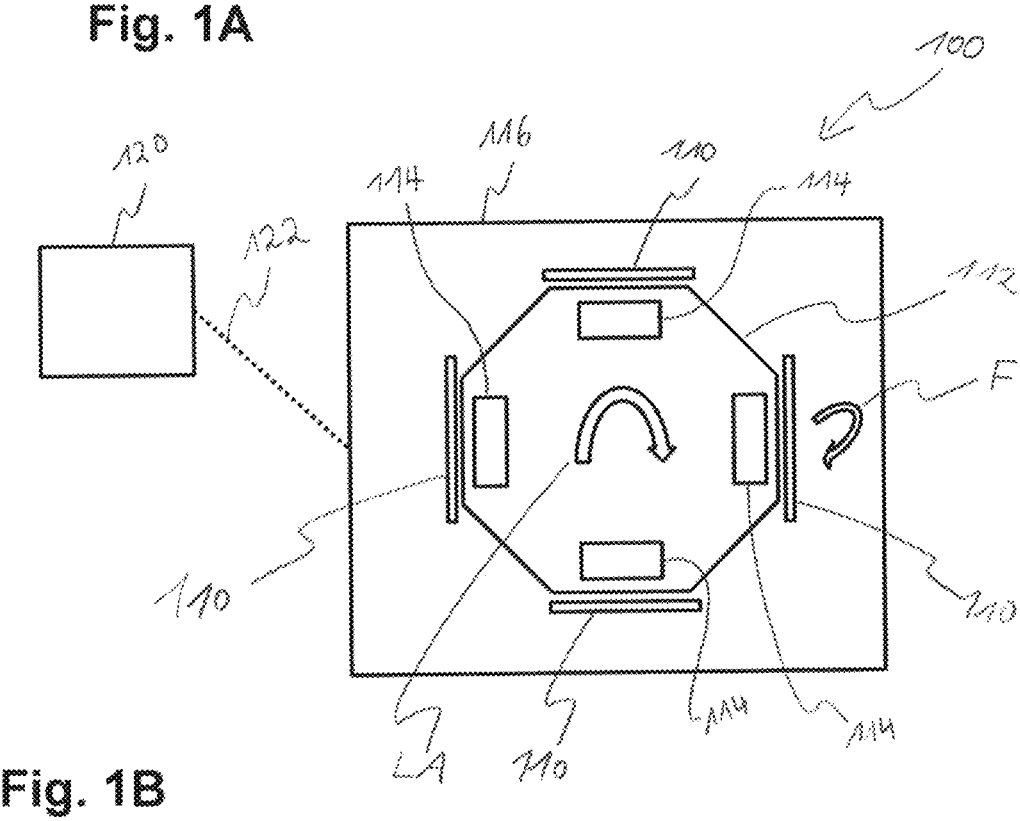
Figure 1C:
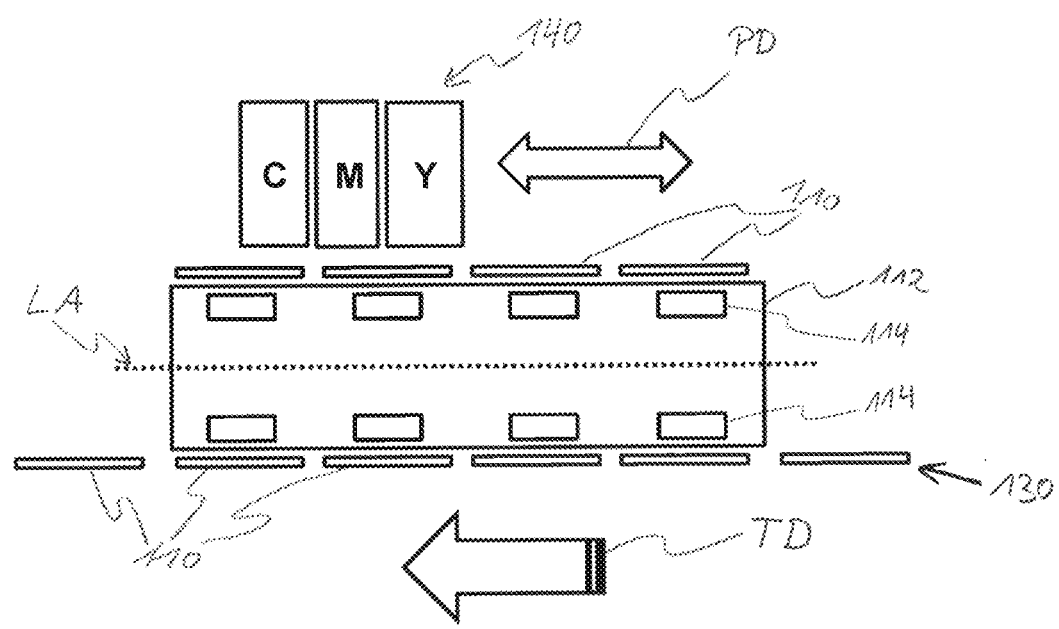
Figure 2:
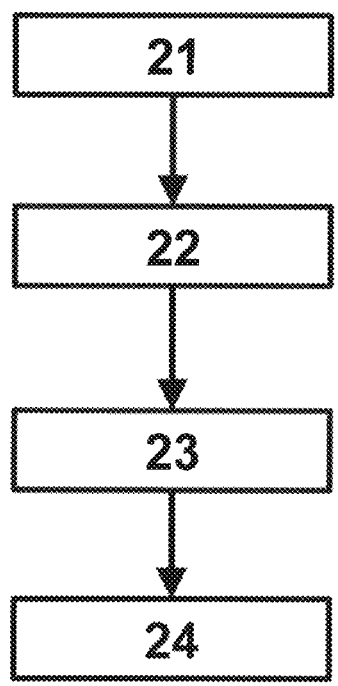
Figure 3A:
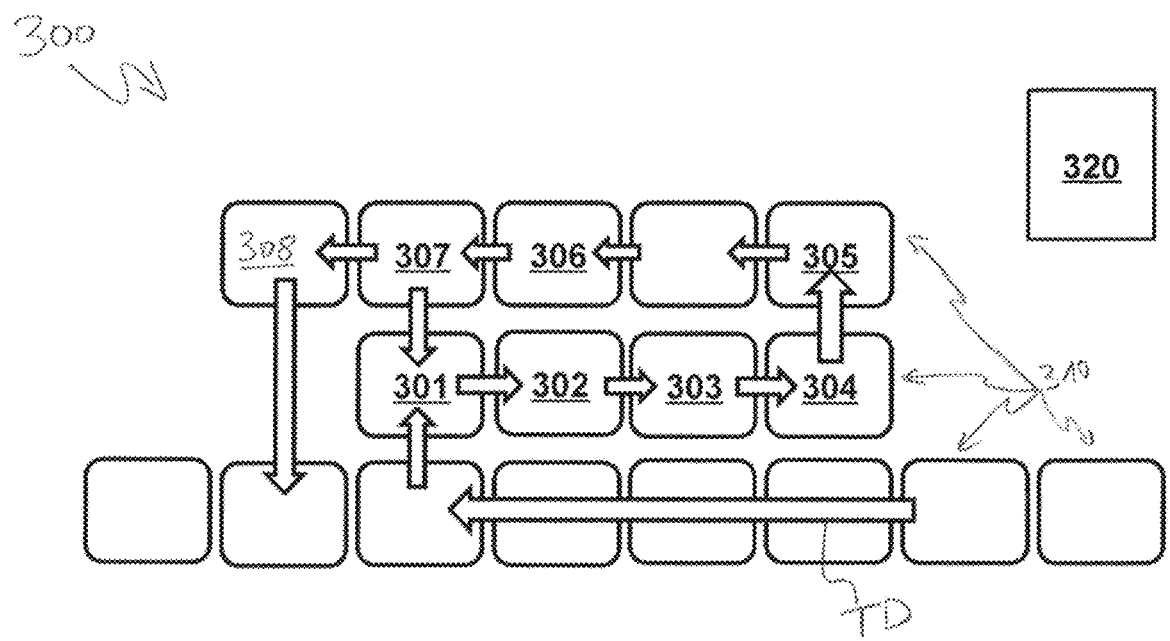
Figure 3B:
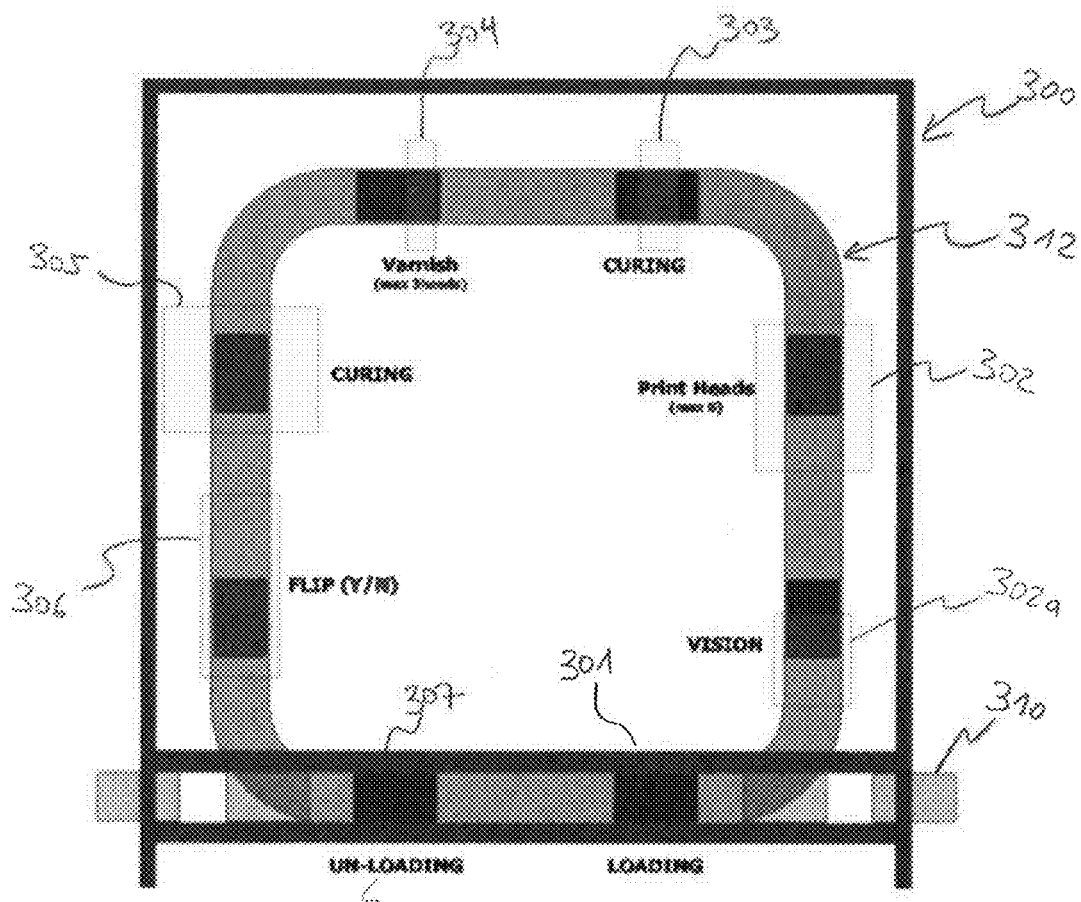

The invention is described further on the basis of the attached figures. Therein, the figures show:

FIGS. 1A to 1C an embodiment of a handling device with a bar-design;

FIG. 2 an embodiment of a method for operating the handling device;

FIGS. 3A and 3B an embodiment of a device with a circular transport path; and

Figure 4:
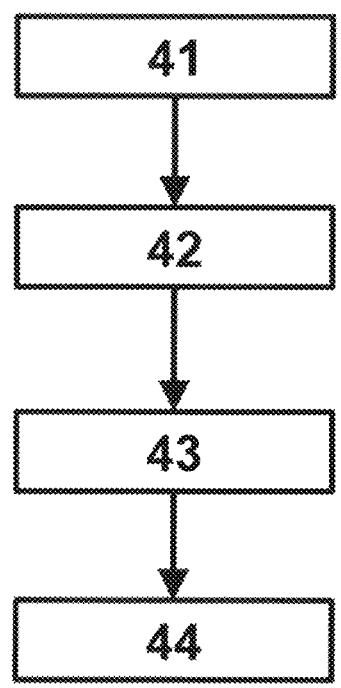

FIG. 4 an embodiment of a method for operating the device.

Turning to FIG. 1A to 1C, an embodiment of a handling device with a bar-design is described.

The handling device 100 comprises a backbone element 112.

In the embodiment, the backbone element 112 has an essentially octagonal cross section. Other forms are possible in other embodiments. In general, the backbone element 112 has a beam-like shape.

The backbone element has lateral faces 112a, 112b, 112c, 112d, which are here defined as every second side of the octagonal cross section. Also here, other forms and definitions of lateral faces of the backbone element 112 are possible in other embodiments.

The backbone element 112 has a plurality of holding elements 114. FIG. 1B shows four holding elements 112, which are each assigned to one of the lateral faces 112a, 112b, 112c, 112d of the backbone element 112.

The holding elements 114 are shown as holding one flat piece 110 each. In the present embodiment, the flat pieces 110 are plastic cards 110.

The holding elements 114 are configured to hold the cards 110 such that they are arranged in a plane that is parallel to the respective lateral face 112a, 112b, 112c, 112d of the backbone element 112.

In particular, the holding elements 114 hold the cards 110 by suction, which is provided from a vacuum pump (not shown). In other embodiments, clamping or another method may be used to hold the cards 110 in place.

The holding elements 114 are configured such that the cards 110 are held in a constant position and orientation relative to the backbone element 112. I.e., when the backbone element 112 is moved, by translation and/or rotation, the cards 110 move with the backbone element 12 in the same way.

The backbone element 112 has a longitudinal axis LA, which is in arranged in an essentially horizontal direction, relative to a gravitational field.

Furthermore, the backbone element 112 is rotatable around the longitudinal axis LA.

To rotate the backbone element 112, a motor (not shown) is controlled, which is coupled with the backbone element 112. The motor can be configured to rotate the backbone element 112 to a given angular position.

The motor may be configured as a step motor. In further embodiments, the backbone element 112 may be rotated at least in part manually.

As shown in FIGS. 1A and 1B, the backbone element 112 with cards 110 and treatment devices 140, 150, 160, 170 may be kept in a housing 116. In other embodiments, no housing 116 may be provided, or the control unit may be kept in the housing 116 as well.

Also, the handling device 100 comprises a control unit 120, which is connected to the housing 116 by a signal connection 122.

The control unit 120 is configured to provide a control signal, in particular a signal to control the angular position of the backbone element 112.

In other embodiments, the control unit 120 is not comprised by the handling device 100, but an external unit.

Also, the handling device 100 may be configured to receive external control signals through the signal connection 122 in another way.

In further embodiments, the handling device 100 may be configured to be operated independently from a control signal, e.g., by performing the same method steps without the possibility of a control through a control unit 120.

Treatment devices 140, 150, 160, 170 are arranged in proximity to the backbone element 112 such that cards at a respective treatment position 142, 152, 162, 172 can be treated.

Herein, the treatment positions 142, 152, 162, 172 are assigned to each treatment device 140, 150, 160, 170.

In the embodiment, the treatment devices 140, 150, 160, 170 can comprise, e.g., a printer device 140, a feeding/loading device 160, a flipping device 150, an imaging device 170 and a curing device printer. Also, treatment devices 140, 150, 160, 170 can be provided for loading the cards 110 onto the backbone element 112 and the holding elements 114, respectively, or for unloading and/or outputting the cards 110.

For the purposes of the present embodiment, a "treatment" of a card 110 can comprise any manipulation. In particular, a treatment can lead to a structural change in the card 110 itself, e.g., by printing on the card, cutting, embossing, engraving, laminating and so on. Furthermore, a treatment can lead to a change in position and/or orientation of the cards 110, in particular relative to the backbone element 112. In particular, also imaging a card 110 can be considered a treatment for the present embodiment.

The treatment devices 140, 150, 160, 170 are configured such that a card 110 can be treated, when it is at the respective treatment position 142, 152, 162, 172 for the respective treatment device 140, 150, 160, 170.

In the case shown here, the treatment positions 142, 152, 162, 172 relate to volumes in space. As a card 110 is arranged in such a volume, it can be treated by the respective treatment device 140, 150, 160, 170. Also, a treatment position 142, 152, 162, 172 can be defined as a specific area, in which a card 110 needs to be positioned, in order to be treated by the respective treatment device 140, 150, 160, 170.

Turning to FIG. 2, an embodiment of a method to operate the above-described handling device is described.

In a step 21, a card 110 is loaded and held by a holding element 114.

In the present embodiment, cards 110 are provided by a supply 130, in particular a belt 130 or a different carrier device, with a transport direction TD. As seen in FIG. 10, a plurality of cards 110 is arranged on the belt 130 and brought into a position below the backbone element 112. The cards 110, which are arranged directly below the backbone element 112, may be taken up by the holding elements 114 and held relative to the backbone element 112.

For example, the cards 110 can be pushed upwards towards the backbone element 112 for loading them and bringing them into a held position of the holding elements 114.

In a step 22, a control signal is received from the control unit 120. This control signal determines a first angular position. A motor is controlled such that the backbone element 112 is rotated around the longitudinal axis LA to the defined first angular position.

According to the embodiment, at least a first and a second angular position is defined.

In further embodiments, further positioning transformations may be carried out, in particular based on the control signal. For example, the control signal may control a translational movement of the backbone element 112 in a direction parallel to the longitudinal axis LA and/or a perpendicular direction. Also, for example, the backbone element 112 may be moved in a swiveling motion, comprising a rotation around an axis that is different from the longitudinal axis LA.

For example, when the device 100 is at the first angular position, the card 110 is arranged at the first treatment position 142. The card 110 can then be treated by the first treatment device 140.

In a step 23, the device 100 is brought to the second angular position by a control signal from the control unit 120. In the present embodiment, a rotation of the backbone element 112 is carried out such that a second angular position is reached, wherein the card 110 is arranged in the second treatment position 152, and can be treated by the second treatment device 150.

The steps 22 and 23 can be repeated: After a card 110 has been treated, the backbone element 112 can rotate to another angular position, and the card 110 can be treated again. In particular, the angular position is now such that the card 110 is arranged at another treatment position, where it can be treated by another treatment device.

In a step 24, the device 100 can then be brought into the loading position, such that the card 100 can be unloaded or output to the belt 130, e.g., by stopping the respective holding elements 114.

A concrete example of printing on different sides of a card 110 is now described:

For example, a card 110 is loaded in step 21. In step 22, the device 100 is brought into the first angular position, thus arranging the card 110 in a first treatment position 142. The card 110 is then treated by a first treatment device 140, in particular a printer device 140. In step 123, the device 100 is then brought into a second angular position, wherein the card 110 is arranged in a second treatment position 152 for treatment by a second treatment device 150, such as a card flipper. In the present case, the card flipper takes the card 110 from the holding device 114, rotates the card 110 as indicated by an arrow F, and returns it to the holding element 114 such that the opposite flat side of the car 110 is now presented outwards. Then, repeating step 22, the device 100 is brought again into the first angular position, wherein the card 110 is in the first treatment position 142 and can be printed on. Thus, both the front and back side of the card 110 can be printed subsequently.

Furthermore, other treatment devices 140, 150, 160, 170 can be provided and the card 110 can be treated by those as well.

Also, cards 110 can be loaded to holding elements 114 of the handling device 100 at different faces 112a, 112b, 112c, 112d of the backbone element 112. Thus, while a card 110 is at the first treatment position 142, another card 110 can be simultaneously at the second or another treatment position 152, 162, 172, and it can be treated simultaneously to the printing operation at the first treatment position 142. For example, a card 110 at the first treatment position 142 can be printed, while another card 110 is flipped at the second treatment position 152 at the same time. Thus, cards 110 can be treated simultaneously in different ways.

The cards 110 can then be unloaded and released from the holding elements 114, and put onto the belt 130 to be transported away. New cards 110 can then be provided and loaded, an afterwards treated.

During the operation of the handling device 100, the backbone element 112 with the holding elements 114 is used as an exchange unit, which transports flat pieces 110 between different treatment positions 142, 152, 162, 172. In particular, the device 100 may replace other transport devices such as a belt or a carrier, which carry the flat pieces 110 to the respective treatment devices 140, 150, 160, 170.

In this concept, several cards 110 can be transported by a standard transport device 130 transport to the handling device 100, acting as an exchange unit. Several positions for cards 110 are provided at each lateral face 112a, 112b, 112c, 112d, and when all positions are filled, the beam is rotated, for example 180°, to the first angular position.

After rotation, two things happen: Cards 110 that are held at the bottom side of the beam 112, are released to the transport device 130, and the holding elements 114 are provided with new cards 110. On the top side of the beam, i.e., at the first treatment position 142, the cards 110 are printed and/or cured.

For this, the first treatment device 140, comprising print heads and curing leads, is movable relative to the backbone element 112 in printer directions PD, and can be translated, in particular parallel to the longitudinal axis LA.

In an embodiment, the device can be brought into another angular position, where the card 110 is in the fourth treatment position 172 and can be treated by another treatment device 170. For example, fiducials of the cards 110 can be taken by an optical measurement process, for example to perform a calibration step and to account for the precise position of the cards 110 relative to the backbone element 112. Thus, the printing process at the first treatment position 142 can be prepared by performing optical measurements on the cards 110, while waiting for the next rotation step.

The concept allow advantageously parallel transport and treatment. For example, a set of cards 110 can be held at one lateral face 112a of the backbone element 112 and printed, while another set of cards 110 is loaded in parallel to another lateral face of the backbone element 112. This can save processing time, since the printing is often a more time-consuming step than other treatments.

Also, cards 110 can be held at fixed positions during treatment processes, such as printing, thus allowing high spatial precision for treatments.

Also, less card handling is required, since the cards 110 can be brought towards different treatment devices 140, 150, 160, 170 simply be rotating the backbone element 112, thereby saving processing time.

For treatments of a card surface from edge to edge, such as edge-to-edge printing, one treatment device 140 may be sufficient. For example, a printer device 140 with one set of print heads may suffice for both side edge to edge printing. This allows saving costs.

For example, a "secondary transport" concept can be realized with the handling device 100:

Cards 110 are taken out of a standard transport, e.g., from a belt 130, and loaded on the device 100 as a "second transport device". Since the device 100 comprises several carriers, corresponding to holding elements 114 at different lateral faces 112a, 112b, 112c, 112d of the backbone element 112, the cards 110 can be loaded independently, while other cards 110 are already treated by the treatment devices 140, 150, 160, 170.

Afterwards, the carrier follows the process of taking fiducial measurements, printing on a front side of the cards 110, curing, applying a varnish, and curing. Also, cards 110 can be flipped in order to treat their back sides.

If the back side of a card 110 needs to be printed, the carrier with the same card 110 will continue its path to the angular position, which allows flipping the card 110, and proceed to the angular position for taking visual fiducial measurements again; afterwards, the back side can be printed and/or treated.

If only the front side of a card 110 should be printed, the card 110 is removed from the holding elements 114 in an angular position of the backbone element 112, which may be identical to the angular position for loading cards 110. In particular, an unloading station may be provided for unloading cards 110 from the device 100.

After unloading a card 110, the carrier will continue to the loading position and take on the next card 110.

Turning to FIGS. 3A, 3B and 4, an embodiment of a device with a circular transport path is described as well as a method to operate the device. Elements, steps and other features, which have been already described above, have the same reference numerals and may not be described again in detail.

FIGS. 3A and 3B show schematically, in principle, the same embodiment of a device 300 for presenting a flat piece to a treatment device.

A card 310 is provided by a transport mechanism and loaded onto a transport element 312, in this case a belt 312 or an assembly of several belts.

The card 310 is thereby brought into the printing transport.

Cards 310 are moving on a belt 312 system through the device 300.

Multiple cards 310 can be loaded and transported by the transport element 312 at the same time.

Along the transport element 312, several positions are configured as treatment positions 302, 303, 304, 305, 306, at which different treatment devices are arranged. When a card 310 reaches one of the treatment positions 302, 303, 304, 305, 306, the respective treatment device can treat it. In particular, one side of the card 310, for example the upwards-facing side of the card 310, is treated.

Examples of treatment devices are described above.

In a step 41, a card 310 is loaded at loading position 301 onto the transport element 312.

Afterwards, in a step 42, the card 310 is treated in different ways.

At a position 302a, visual measurements are performed, in particular for fiducial measurements and/or for performing a calibration step.

The card 310 is then transported to a printing position 302, where an image is printed on the upwards-facing side of the card 310. Subsequently, the card 310 is cured at position 303.

A varnish is applied to the card 310 at position 304, in a varnish lane, where varnish is applied. A step of curing the varnish is performed at a position 305.

At a position 306, it is determined whether the opposite side, i.e., the backside of the card 310, needs to be printed on. If this is the case, a flipping device rotates the card 310 and the card 310 is brought back onto the transport element 312.

If it is determined at position 306 that the backside should not be printed on, the card 310 is not flipped.

In step 43, it is determined, whether the card 310 should be treated again—if applicable, on the backside—or whether it should be output.

If the card 310 is to be treated again, it is from a switching position 307 into the same transport path another time, starting with the visual measurements at position 302a.

On the other hand, if the card 310 should be output, it is unloaded in a step 44.

In the embodiment, the unloading happens at an unload position 308, where an unloading device moves the card 310 from the transport element 312 of the device 300 to the standard transport.

An unloading device may, for example, comprise a pusher.

Steps 42 and 43 may be repeated iteratively, until it is determined that the card 310 is to be unloaded.

REFERENCE NUMERALS 21, 22, 23, 24 Step
41, 42, 43, 44 Step
100 Handling device
110 Flat piece; plastic card substrate; plastic card
112 Backbone element
112a, 112b, 112c, 112d Lateral face of backbone element 112
114 Holding element
116 Housing
120 Control unit
122 Signal connection
130 Supply; belt
140 First treatment device; printer device
142 First treatment position
150 Second treatment device; flipping device
152 Second treatment position
160 Third treatment device; loading device
162 Third treatment position (loading)
170 Fourth treatment device imaging device
172 Fourth treatment position
300 Device
301 Loading position
302a Visual measurement position
302 Printing position
303 Curing position
304 Varnishing position
305 Curing position
306 Flipping position
307 Transport switching position
308 Unloading position
310 Flat piece; plastic card -continued 312 Transport element; belt
320 Control unit
F Flipping direction
LA Longitudinal axis
PD Printer direction
TD Transport direction 312 Transport element; belt
320 Control unit
F Flipping direction
LA Longitudinal axis
PD Printer direction
TD Transport direction

The invention claimed is:

1. A handling device for presenting a flat piece to at least a first and a second treatment device, the handling device comprising:
   an elongated backbone element that is rotatable along a longitudinal axis and has at least a first and a second angular position;
   a holding element configured to hold the flat piece relative to the backbone element; and
   a control unit configured to control the angular position of the backbone element;
   wherein when the backbone element is at the first angular position, the flat piece is at a first treatment position for the first treatment device, and when the backbone element is at the second angular position, the flat piece is at a second treatment position for the second treatment device; and
   wherein the first treatment device is one of a printer device or a flipping device, and the second treatment device is the other of the printer device or the flipping device.

2. The handling device of claim 1, wherein the flat piece is a plastic card substrate.

3. The handling device of claim 1, wherein the holding element is configured to hold the flat piece by at least one of suction or clamping.

4. The handling device of claim 1, wherein:
   the elongated backbone element comprises at least a first and a second lateral face; and
   the holding element comprises at least a first and a second holding element configured for holding flat pieces at the first and second lateral faces, respectively.

5. The handling device of claim 4, wherein:
   the flat piece is held at the first lateral face; and
   when the backbone element is at the second angular position, a second flat piece, held at the second lateral face, is at the first treatment position for the first treatment device.

6. The handling device of claim 4, wherein the holding element comprises at least two holding elements for each lateral face of the backbone element.

7. The handling device of claim 4, wherein the backbone element has three or four lateral faces.

8. The handling device of claim 4, wherein the backbone element has a cross section in a form of a polygon.

9. A system for treating flat pieces, the system comprising:
   a handling device configured for holding at least a first and a second flat piece at a first and second position relative to the handling device;
   a first treatment device configured for treating a corresponding flat piece at a first treatment position; and
   a second treatment device configured for treating a corresponding flat piece at a second treatment position;
   wherein the handling device is at least partially rotatable around a longitudinal axis to at least a first and a second angular position;
   wherein the first flat piece is at the first treatment position when the handling device is at the first angular position, and the second flat piece is at the first treatment position when the handling device is at the second angular position; and
   wherein the first treatment device is one of a printer device or a flipping device, and the second treatment device is the other of the printer device or the flipping device.

10. The system of claim 9, wherein the first flat piece is at the second treatment position when the handling device is at the second angular position.

11. The system of claim 9, wherein the second flat piece is at the second treatment position when the handling device is at the first angular position.

12. The system of claim 9, wherein the first and second flat pieces are plastic card substrates.

13. The system of claim 9, wherein at least one of the first or second treatment devices is movable with respect to the first or second treatment position, respectively.

14. A method for treating a flat piece, the method comprising:
   holding a first flat piece at a first lateral face of the handling device; and
   generating a control signal to control a rotation of the handling device around a longitudinal axis of the handling device to a first or second angular position;
   rotating the handling device to the first angular position and treating a first surface of the first flat piece using a first treatment device; and
   subsequently rotating the handling device to the second angular position and flipping the first flat piece using a second treatment device.

15. The method of claim 14, further comprising subsequently rotating the handling device back to the first angular position and treating a second surface of the first flat piece using the first treatment device.

16. The method of claim 14, wherein the first treatment device is a printer device.

* * * * *